United States Patent Office 3,073,706
Patented Jan. 15, 1963

3,073,706
AEROSOLS FOR THE CARE OF FLOORS
Jules Treboux, Riehen, near Basel, and Willy Roth, Strengelbach, Aargau, Switzerland, assignors to J. R. Geigy A.-G., Basel, Switzerland
No Drawing. Filed Aug. 10, 1959, Ser. No. 832,502
Claims priority, application Switzerland June 19, 1959
5 Claims. (Cl. 106—10)

It has been found that a composition which is very suitable for the care of floors and which is applied by spraying under pressure is obtained if a mixture of waxes or waxy substances is liquefied with solvents or dispersing agents and propellants are added to this mixture, provided that the composition is prepared under the following conditions:

The waxes or waxy substances are solid but some part thereof can also be liquid, they must amount to 5–15% of the total weight of the finished preparation and must consist of a mixture of at least two substances from the following groups:

(a) Esters from saturated and unsaturated aliphatic, aromatic and alicyclic mono- and poly-carboxylic acids having at least 10 carbon atoms, and from saturated and unsaturated aliphatic, aromatic and alicyclic monohydric and polyhydric alcohols having at least two carbon atoms;
(b) Free, saturated and unsaturated aliphatic mono- and polycarboxylic acids having at least 10 carbon atoms;
(c) Aliphatic acid amides which melt at over 20° C.;
(d) Hydrocarbons which are solid at room temperature or 20° C.;
(e) Halogen derivatives of such hydrocarbons and
(f) Organo-silicium compounds.

Propellants must make up 20–60% of the total weight of the finished preparation.

The solvents or dispersing agents make up the number of parts of the waxes and propellants to 100%; they make up 25–75% of the total weight of the finished preparation and consist of compounds or mixtures from the groups of aliphatic, alicyclic and aromatic hydrocarbons which are liquid at room temperature or 20° C. or of such halogen derivatives of low molecular hydrocarbons and, possibly, also of additional solvents.

The following particulars are given regarding these three groups of substances: Waxes or waxy substances: Of the esters defined under (a), advantageously natural and synthetic waxes and resins such as esters of high molecular aliphatic carboxylic acids with high molecular alcohols can be used, also natural or modified natural resins and waxes can be used. If the carboxylic acids mentioned under (b), advantageously stearic acid, oleic acid and other aliphatic fatty acids can be used. Of the acid amides mentioned under (c), for example, acid amides of higher aliphatic fatty acids can be used. The hydrocarbons solid at room temperature or 20° C. named under (d) comprise high molecular paraffins, for example the marketed product which melts at 53° C. Chlorinated paraffins having a chlorine content of 10–50% are used as halogen derivatives of such hydrocarbons mentioned under (e). The organo-silicium compounds mentioned under (f) are, for example, silicon oils having a viscosity of 300–1000 centistokes at 25° C.

As solvents can be used hydrocarbons and halogenated derivatives thereof as well as mixtures thereof which are liquid at room temperature or at 20° C., which can either wholly or partially dissolve or disperse the substances listed under (a)–(f), in particular a mixture of aliphatic hydrocarbons boiling between 150 and 260° C., turpentine oil etc. Turpentine oil is very well suited for the production of mixtures for the care of wood and stone floors. Synthetic substances such as are often used today as floor covering or components thereof are affected by turpentine oil, however, and in addition, it is possible that in the presence of propellants consisting of flourinated hydrocarbons turpentine oil is altered so that there is a rather unpleasant smell. This can be avoided to a considerable extent by replacing either the whole or part of the turpentine oil by an organic solvent which is completely or partly water soluble. This organic solvent should contain at least two O atoms of which at least one is in the —C—O—C-grouping, advantageously in the cyclic molecule, and it should contain 2–8 advantageously 4–6 C atoms. Examples of such solvents are: 1.3- and 1.4-dioxan, γ-valerolactone, tetrahydrofurfuryl alcohol, 2-dimethyl-4-hydroxymethyl-1.3-dioxolan, glycol monoethyl ether acetate, diethylene glycol diethyl ether etc. The boiling points of the solvents defined above should lie between 100 and 200° C.; those having lower boiling points within this range are preferred. The use of these solvents instead of turpentine oil has also the advantage that considerably slighter amounts attain the same effect. In general, 3–10%, calculated on the total amount of components of the mixture, is sufficient.

Hydrocarbons which are gaseous at room temperature or 20° C. as well as halogenated derivatives of such hydrocarbons and mixtures thereof such as, e.g. butane, trichloromonofluoromethane, dichlorodifluoromethane etc. are used as propellants.

The following is important: The mixture of the starting products which are solid, liquid or gaseous at room temperature or at 20° C. defined above consists mainly of a solution of the solid and gaseous products in the liquid components; however, some of the solid components are dispersed as such in the liquid components. It has now been found that stoppage of the aerosol plunger can be avoided and a uniform mixture can be sprayed if the mixtures produced according to the invention are so composed that the specific weight of the liquid phase corresponds to within ±5% of the specific weight of the suspended part of the components solid at room temperature or 20° C.

The following examples illustrate some typical methods of producing the mixture according to the invention without limiting the scope of the patent. Parts are given as parts by weight.

*Example 1*

The following components are used:

1.64 parts by weight of a mixture of hydrocarbons consisting chiefly of isoparaffins, normal paraffins and naphthene hydrocarbons having a molecular weight of 600–900 and a melting point of about 88° C. as well as a penetration of 2/7 according to the definition of ASTM (American Society for Testing Materials),
0.22 part by weight of a mixture of hydrocarbons of the composition defined above but having a melting point of about 73° C. and a penetration of 25/35 as defined by ASTM,
0.35 part by weight of a synthetic ester of montanic acid with high molecular alcohols,
1.07 parts by weight of a synthetic ester of montanic acid with ethylene glycol,
4.75 parts by weight of paraffin having a melting point of 52–54° C.,
20.64 parts by weight of turpentine oil,
30.79 parts by weight of a petroleum fraction boiling between 180 and 220° C.,
0.54 part by weight of a smelling substance.

The above components are dissolved with each other, if necessary by warming to 50° C. 60 parts by weight of this solution are put into an aerosol container and either 40 parts by weight of dichlorodifluoromethane are added by the cold process or the same amount of propellant is forced in through the valve. The mixture so prepared is excellently suitable for polishing all types of wood floors as well as of flagstones and ceramic tiles.

*Example 2*

The components are as follows:

1.83 parts by weight of a mixture of hydrocarbons consisting chiefly of isoparaffins, normal paraffins, and naphthene hydrocarbons having a molecular weight of 600–900 and a melting point of about 88° C. as well as a penetration of 2/7 according to ASTM,
0.26 part by weight of a hydrocarbon mixture of the above composition but having a melting point of about 73° C. and a penetration of 25/35 according to ASTM,
0.39 part by weight of a synthetic ester of montanic acid with high molecular alcohols,
1.20 parts by weight of a synthetic ester of a montanic acid with ethylene glycol,
5.30 parts by weight of paraffin having a melting point of 52–54° C.,
16.11 parts by weight of turpentine oil,
34.04 parts of a petroleum fraction boiling between 180 and 220° C.,
0.60 part by weight of a smelling substance,
0.27 part by weight of a difficultly volatile silicon oil having a viscosity of 500 centistokes at 25° C. and a specific weight of 0.97 at 25° C.

A container is filled with 60 parts by weight of this mixture and 40 parts by weight of dichlorodifluoromethane or of a mixture of 50% each of trichloromonofluoromethane and dichlorodifluoromethane as described in Example 1. The preparation has the same properties as the mixture described in Example 1.

*Example 3*

Components:

1:53 parts by weight of a hydrocarbon mixture consisting mainly of isoparaffins, normal paraffins and naphthene hydrocarbons having a molecular weight of 600–900 and a melting point of about 88° C. as well as a penetration of 2/7 according to ASTM,
0.35 part by weight of a hydrocarbon mixture of the above composition but having a melting point of about 73° C. and a penetration of 25/35 according to ASTM,
0.60 part by weight of a synthetic ester of montanic acid with high molecular alcohols,
1.80 parts by weight of a synthetic ester of montanic acid with ethylene glycol,
4.70 parts by weight of paraffin having a melting point of 52–54° C.,
16.11 parts by weight of turpentine oil,
34.04 parts by weight of a petroleum fraction boiling between 180 and 220 °C.,
0.60 part by weight of a smelling substance,
0.27 part by weight of a difficultly volatile silicon oil having a viscosity of 500 centistokes at 25° C. and a specific weight of 0.97 at 25° C.

60 parts by weight of the above mixture and 40 parts by weight of butane are put into an aerosol container as described in Example 1. This mixture is excellently suitable for the care of floors.

*Example 4*

Components:

0.59 part by weight of a mixture of hydrocarbons consisting mainly of isoparaffins, normal paraffins and naphthene hydrocarbons having a molecular weight of 600–900 and a melting point of about 73° C. and a penetration of 25/35 according to ASTM,
2.53 parts by weight of a hydrocarbon mixture of the above composition but having a melting point of about 88° C. and a penetration of 2/7 according to ASTM,
1.01 parts by weight of a synthetic ester of montanic acid with high molecular alcohols,
3.00 parts by weight of a synthetic ester of montanic acid with propylene glycol,
7.85 parts by weight of paraffin having a melting point of 60–62° C.,
84.57 parts by weight of a petroleum fraction boiling between 180 and 220° C.,
0.45 part by weight of a difficultly volatile silicon oil having a viscosity of 500 centistokes at 25° C., and a specific weight of 0.97 at 20° C.

60 parts by weight of this mixture and 40 parts by weight of a mixture of propane/butane are filled into an aerosol container as described in Example 1. This preparation has the same properties as the composition described in Example 1.

*Example 5*

Components:

7.80 parts by weight of a synthetic ester of montanic acid with a fatty alcohol,
7.20 parts by weight of paraffin having a melting point of 52–54° C.,
85.00 parts by weight of a petroleum fraction boiling between 150 and 180° C. and a content of aromatic substances of 10%.

60 parts by weight of this mixture are mixed with 40 parts by weight of dichlorodifluoromethane. A preparation which is well suited for the care of floors and which is applied by spraying is obtained.

*Example 6*

Components:

9.0 parts by weight of a synthetic ester of montanic acid with high molecular alcohols,
1.8 parts by weight of a hydrocarbon mixture consisting chiefly of isoparaffins, normal paraffins and naphthene hydrocarbons having a molecular weight of 600–900 and a melting point of about 88° C. as well as a penetration of 2/7 according to ASTM,
3.0 parts by weight of a synthetic ester of a montanic acid with ethylene glycol,
1.2 parts by weight of paraffin with a melting point of 52–54° C.,
40.0 parts by weight of turpentine oil,
45.0 parts by weight of a petroleum fraction boiling between 180 and 220° C.

80 parts by weight of this mixture and 20 parts by weight of dichlorodifluoromethane are filled into an aersol container to form a very suitable agent for the care of floors.

*Example 7*

Components:

12.0 parts by weight of a synthetic ester of montanic acid with high molecular alcohols,
4.0 parts by weight of a synthetic ester of montanic acid with ethylene glycol,
2.40 parts by weight of a hydrocarbon mixture consisting chiefly of isoparaffins, normal paraffins and naphthene hydrocarbons having a molecular weight of 600–900, a melting point of 88° C. and a penetration of 2/7 according to ASTM,
1.60 parts by weight of paraffin having a melting point of 52–54° C.,
5.00 parts of 1.4-dioxan,
0.33 part by weight of a smelling substance,
74.67 parts by weight of a petroleum fraction boiling between 180° and 220° C.

A container filled with 60 parts by weight of this mixture and 40 parts by weight of dichlorodifluoromethane produces an agent which is very suitable for the care of floors and which remains liquid always when packed in an aerosol container.

Example 8

Components:

15.00 parts by weight of a synthetic ester of montanic acid with high molecular alcohols,
3.00 parts by weight of a synthetic ester of montanic acid with ethylene glycol,
5.0 parts by weight of a hydrocarbon mixture consisting chiefly of isoparaffins, normal paraffins and naphthene hydrocarbons having a molecular weight of 600–900, a melting point of 88° C. and a penetration of 2/7 according to ASTM,
2.0 parts of paraffin melting at 52–54° C.,
8.33 parts by weight of γ-valerolactone,
0.34 part by weight of a smelling substance,
66.33 parts by weight of a petroleum fraction boiling between 180 and 220° C.

An aerosol container filled with 60 parts by weight of this mixture,
30 parts by weight of dichlorodifluoromethane and
10 parts by weight of propane produces an agent which is very well suited for the care of floors.

What we claim is:

1. A self-propellant spray wax polish composition for the care of floors consisting essentially, per 100 parts by weight of the composition, of a homogeneous mixture of (1) between about 5 and 15 parts by weight of a mixture consisting of a synthetic ester of montanic acid with a high molecular alcohol, a synthetic ester of montanic acid with ethylene glycol, a solid hydrocarbon mixture consisting of isoparaffins, normal paraffins and naphthene hydrocarbons having a molecular weight of 600–900 and a paraffin having a melting point of 52–54° C., said mixture constituting the effective polishing wax base of the composition, (2) between about 25 and 75 parts by weight of a liquid solvent mixture consisting of a petroleum fraction boiling between 180 and 220° and an organic solvent with 4 to 6 carbon atoms, liquid at 20° C., which contains at least two oxygen atoms of which one is in a C—O—C— grouping, and (3) between about 20 and 60 parts by weight of a liquefied propellant gas.

2. The composition according to claim 1 wherein the oxygen-containing organic solvent with 4 to 6 carbon atoms is dioxan, which is present in an amount of 3 to 10 parts, calculated on the total amount of the components of the whole composition.

3. The composition according to claim 1 wherein the liquefied propellant gas is a member selected from the group consisting of propane, butane, dichlorodifluoromethane and trichloromonofluoromethane.

4. A self-propellant spray wax polish composition for the care of floors consisting essentially of a homogeneous mixture of 12.0 parts by weight of a synthetic ester of montanic acid with a high molecular alcohol,
4.0 parts by weight of a synthetic ester of montanic acid with ethylene glycol,
2.40 parts by weight of a solid hydrocarbon mixture consisting of isoparaffins, normal paraffins and naphthene hydrocarbons having a molecular weight of 600–900, melting point of 88° C. and a penetration of 2/7 according to ASTM,
1.60 parts by weight of paraffin having a melting point of 52–54° C.,
5.00 parts of 1.4-dioxan,
0.33 part by weight of olfactory substance,
74.67 parts by weight of a petroleum fraction boiling between 180° and 220° C., this mixture forming in all 100 parts by weight; and 67 parts by weight of dichlorodifluoromethane as propellant.

5. A self-propellant spray wax polish composition for the care of floors consisting essentially of a homogeneous mixture of 15.00 parts by weight of a synthetic ester of montanic acid with a high molecular alcohol,
3.00 parts by weight of a synthetic ester of montanic acid with ethylene glycol,
5.00 parts by weight of a solid hydrocarbon mixture consisting of isoparaffins, normal paraffins and naphthene hydrocarbons having a molecular weight of 600-900, a melting point of 88° C. and a penetration of 2/7 according to ASTM,
2.00 parts of paraffin melting at 52–54° C.,
8.33 parts by weight of γ-valerolactone,
0.34 part by weight of olfactory substance,
66.33 parts by weight of a petroleum fraction boiling between 180 and 220° C., this mixture forming in all 100 parts by weight; and, as propellant, 67 parts by weight of a 3:1 mixture of dichlorodifluoromethane and propane.

References Cited in the file of this patent

UNITED STATES PATENTS

| | | |
|---|---|---|
| 2,524,590 | Boe | Oct. 3, 1950 |
| 2,902,376 | Beacher et al. | Sept. 1, 1959 |
| 2,907,664 | Schoenholz et al. | Oct. 6, 1959 |